United States Patent
Abuelsaad et al.

(10) Patent No.: US 9,378,357 B2
(45) Date of Patent: Jun. 28, 2016

(54) TIMING OF PASSWORD CHANGE REQUIREMENTS BASED ON AMBIENT INTELLIGENCE

(71) Applicant: International Business Machines Corporation, Armonk, NY (US)

(72) Inventors: Tamer E. Abuelsaad, Somers, NY (US); Carlos A. Hoyos, Brooklyn, NY (US); Nader M. Nassar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 14/478,110

(22) Filed: Sep. 5, 2014

(65) Prior Publication Data

US 2016/0070903 A1    Mar. 10, 2016

(51) Int. Cl.
*G06F 21/45* (2013.01)

(52) U.S. Cl.
CPC .................................... *G06F 21/45* (2013.01)

(58) Field of Classification Search
CPC ....... G06F 21/45; G06F 21/46; G06F 21/316; G06F 21/577
USPC ....................................................... 726/6, 18
See application file for complete search history.

(56) References Cited

U.S. PATENT DOCUMENTS

| | | | |
|---|---|---|---|
| 5,991,882 A | 11/1999 | O'Connell | |
| 6,530,024 B1 | 3/2003 | Proctor | |
| 7,200,754 B2 | 4/2007 | Walters | |
| 8,332,650 B2 | 12/2012 | Banes et al. | |
| 8,370,925 B2 | 2/2013 | Childress et al. | |
| 8,424,067 B2 | 4/2013 | Keohane et al. | |
| 8,607,303 B2 | 12/2013 | Morris et al. | |
| 2004/0177272 A1* | 9/2004 | Walters ................... | G06F 21/46 713/183 |
| 2008/0114986 A1* | 5/2008 | Morris ..................... | G06F 21/46 713/183 |
| 2009/0055910 A1* | 2/2009 | Lee ......................... | G06F 21/46 726/6 |
| 2009/0126018 A1* | 5/2009 | Keohane ................. | G06F 21/46 726/23 |
| 2009/0199294 A1* | 8/2009 | Schneider ............. | G06F 21/316 726/18 |
| 2011/0061089 A1 | 3/2011 | O'Sullivan et al. | |

FOREIGN PATENT DOCUMENTS

| | | |
|---|---|---|
| EP | 1569064 B1 | 4/2007 |
| WO | 03096605 A1 | 11/2003 |

* cited by examiner

*Primary Examiner* — Kambiz Zand
*Assistant Examiner* — Benjamin Kaplan
(74) *Attorney, Agent, or Firm* — Fusheng Xu

(57) ABSTRACT

A user's required password change is postponed according to context information determined to indicate that the current password change timing is at an inconvenient time for the user. A user is permitted to extend the use of an expired password when a pre-determined password validity period ends.

17 Claims, 2 Drawing Sheets

TIMING OF PASSWORD CHANGE REQUIREMENTS BASED ON AMBIENT INTELLIGENCE

FIELD OF THE INVENTION

The present invention relates generally to the field of electronic systems, and more particularly to password management.

BACKGROUND OF THE INVENTION

A password is used for user authentication to gain access to a resource. In modern times, passwords are commonly used by people during a log-in process that controls access to protected computer operating systems, mobile phones, cable TV decoders, automated teller machines (ATMs), etc. A typical computer user has passwords for many purposes: logging into accounts, retrieving e-mail, accessing applications, databases, networks, and web sites.

"Password aging" is a feature of some electronic systems. Password aging forces users to change passwords frequently (e.g., quarterly, monthly, or even more often). Password aging policies are widely used as they are one of only a few built-in policy mechanisms in some systems, for example, a laptop device, a mobile device, email/intranet account, and access to servers.

SUMMARY

Embodiments of the present invention disclose a method, computer program product, and computer system for changing a deadline of a required password change based on context information. A first computer system determines a password change deadline for a user. The first computer system identifies a context information dataset. The first computer system analyzes the context information dataset. The first computer system changes the password change deadline based, at least in part, on the context information dataset.

DETAILED DESCRIPTION

Figure 1:
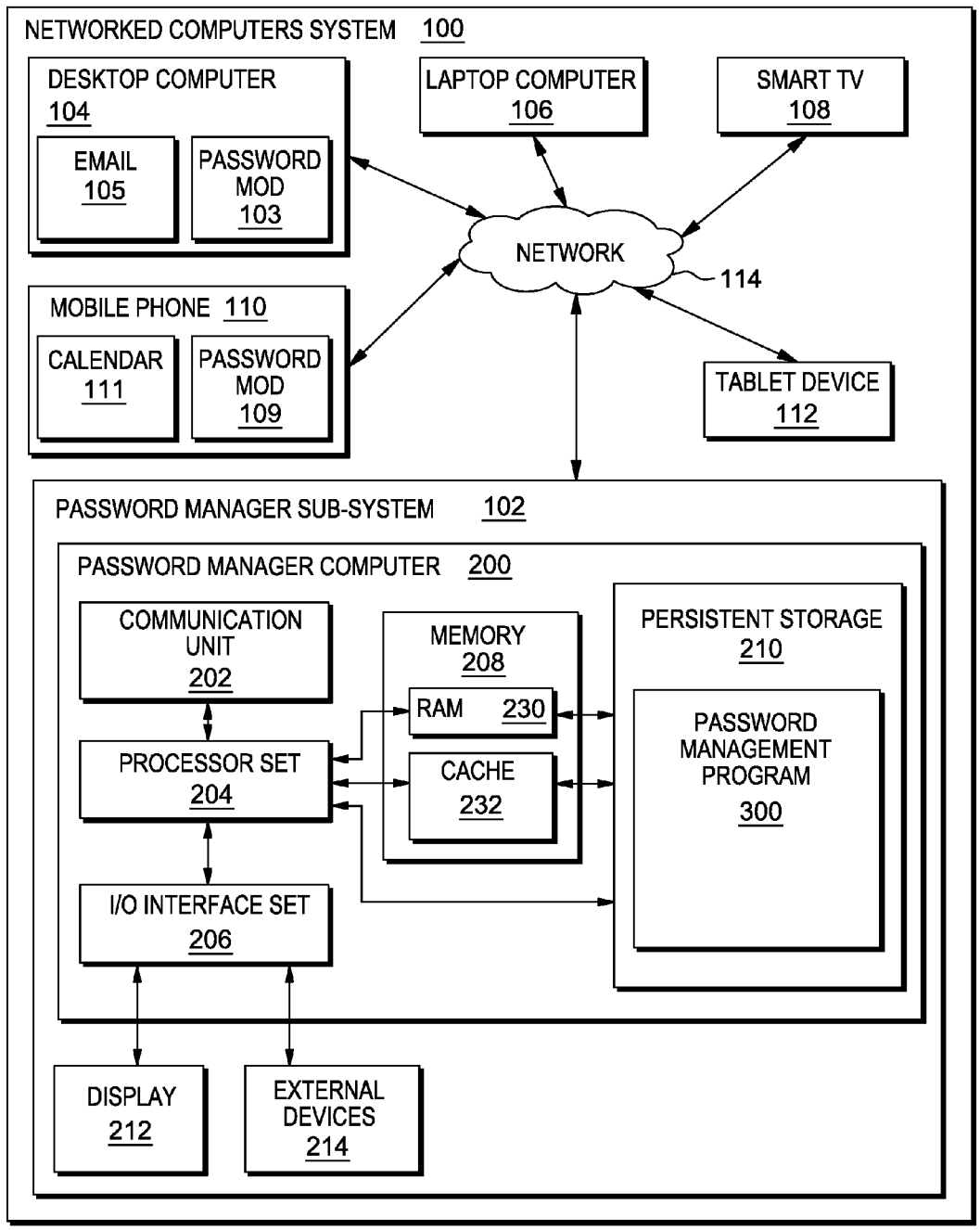
FIG. 1 is a schematic view of a first embodiment of a system according to the present invention.

Forcing a user to change their password on a given interval (e.g., password aging) is a common security policy used to mitigate against the risk associated with brute force attacks and compromised passwords. When a user does not change their password before the expiration date, the user is oftentimes locked out, requiring an account reset or a password change before the user can gain access to the target system. Under certain circumstances, referred to herein as an "inconvenient time," it might be more effective to delay or accelerate a password change, for example, when an urgent issue arises (e.g., a high priority ticket has been opened against a server, or the deadline for changing the password occurs when the user has just landed after a trip and is trying to call a taxi). The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: password manager sub-system 102; desktop computer sub-system 104; email 105; laptop computer sub-system 106; smart TV sub-system 108; mobile phone sub-system 110; calendar 111; password mod 103, 109; tablet device sub-system 112; communication network 114; password manager computer 200; communication unit 202; processor set 204; input/output (I/O) interface set 206; memory device 208; persistent storage device 210; display device 212; external device set 214; random access memory (RAM) devices 230; cache memory device 232; and password management program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Password management program 300 operates to manage passwords used by a user to access systems and/or devices, such as desktop computer 104, laptop computer 106, smart TV 108, mobile phone 110, and tablet device 112. Password management includes, but is not limited to, (i) log-in process; (ii) password aging policy; (iii) password change; (iv) security questions; (v) context awareness (situational) assessment; and/or (vi) password snooze. The context awareness assessment evaluates ambient, or environmental, factors, such as time of day or an emergency work-related situation, to make a decision as to whether change or delay the password change deadline. The password management program may, for example, acquire ambient factors by communicating with password mod 103 and email application 105 running on desktop computer 104, or password mod 109 and calendar application 111 running on mobile phone 110. In the embodiment that follows, a server-type computer is managing the password expiration policy for several network-attached sub-systems. Some embodiments of the present invention include a password management program on a single device to manage password timing for that device. For example, the context analysis is performed in a stand-alone calendar running on a computer system that communicates with password management program 300.

Some embodiments of the present invention recognize the following facts, potential problems and/or potential areas for improvement with respect to the current state of the art: (i) under certain circumstances, it is more effective to delay a required password change (e.g., a user attempting to access the device has just landed after a trip); (ii) the "always on" nature of businesses means that users can find themselves being locked out of an account at an inconvenient time; (iii) a password aging policy that considers environmental factors provides flexibility to snooze, or ignore, the enforcement of a password expiration rule; (iv) alerting a user in advance that a password is about to expire only works for systems that can alert the user; (vi) alerting users in advance of a password expiration event does not work if the notification does not reach the right person (e.g., in the case of shared IDs where more than one person might have access to an account); (vii) administrators may temporarily disable or reset the expiration date on an account, however, there is no implementation that takes into account environmental and/or behavioral information to dynamically modify or "snooze" enforcement of an aging policy; (viii) conventional IT systems follow the prescribed rules without considering context information; and/or (ix) when context information is not considered, circumvention of security, such as authentication and authorization, is likely. (for example, many users do not enable password authentication on their devices).

Authentication mechanisms operate on validation periods where designated authentication means expire at a specified time. Some validation periods are very long, such as account passwords, while others are quite short, such as authentication tokens. When an authentication mechanism is up for renewal (e.g., the expiration date arrives), conventional IT systems prohibit any further usage of the system until a new password is created. To illustrate how some embodiments of the present invention are useful, two examples are considered as below.

Example 1: a user wakes up in the middle of the night remembering to send an important message. The user attempts to log into the user's mobile device, and the device requests that the user enters a current password for the device. When the user enters the current password, the device alerts the user that the entered password has expired. No further access to the device is granted until the password is renewed. In a moment of impatience, the user makes up a password to satisfy the immediate requirement. Finally, the user accesses the email client to send out the email. The next morning the user attempts to check for new email on the mobile device. According to the security policy, the mobile device challenges the user to enter the current password. The user enters the expired password, forgetting the late night activity, only to have the password rejected by the device. The user recalls changing the password overnight, but does not recall the new password. Accordingly, the user is locked out of the mobile device until a password reset can be completed by the administrator.

Example 2: a user receives a call from a manager alerting the user that there is a critical ticket in the queue because an entire data center for a top client has crashed. When the user attempts to log into the user's laptop, the entered password is rejected because it has expired. The user creates a new password, but the system rejects it because it does not meet organization's policy. The user tries a second, third, fourth, and finally, only on the sixth try, the user comes up with a password that satisfies the predefined password rules. All this time was lost while the user was on the phone with a superior and, obviously, feeling the pressure of the moment.

The simplest approach to address the problem associated with the above-mentioned examples and improve the usability of password aging is by alerting users that their password is about to expire. This gives the user a window of time to change the password before the user account is locked. The drawback is that this only works for systems that can alert the user, for example, a user receives an alert when the user' intranet ID will expire, but the user does not receive one when the user's VPN (virtual private network) password will expire. Likewise, this does not work if the notification does not reach a right person, for example, in the case of shared IDs where more than one person accesses an account.

The present invention focuses on bridging security and usability, in particular authentication. With the present invention, one of the most grumbled about security features becomes user friendly and acceptable. The present disclosure use environmental variables to provide a password change snooze/delay the need to lock a user out of an account for a given time period until the condition that triggered this has been addressed. The environmental variables may include, but are not limited to, (i) time of day; (ii) received messages, such as urgent messages including email or text; (iii) emergency work related situations, such as a critical ticket waiting, or a server being under attack (e.g., distributed denial-of-service behavior detected on a device user is trying to log on); and/or (iv) a user's situation, such as the user just returned from a long trip.

Figure 2:
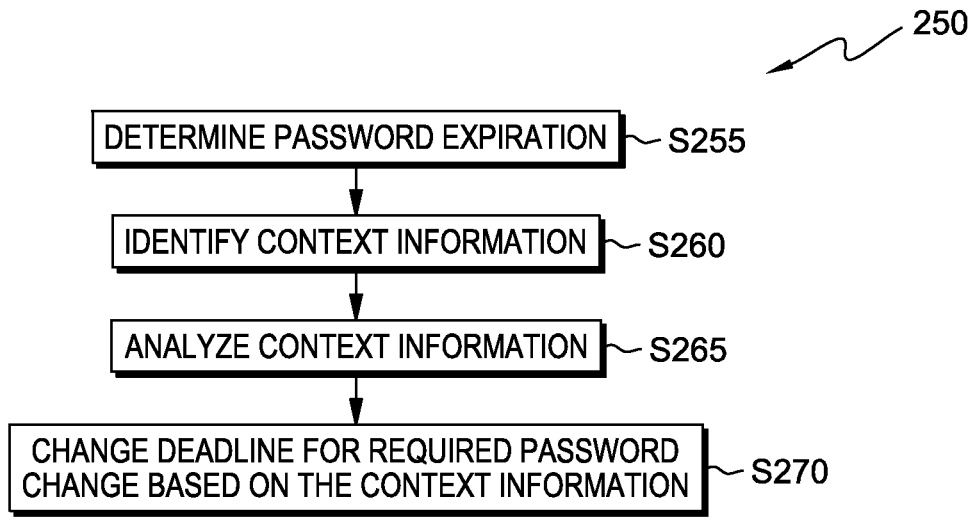
FIG. 2 is a flowchart showing a method performed, at least in part, by the first embodiment system.
Figure 3:
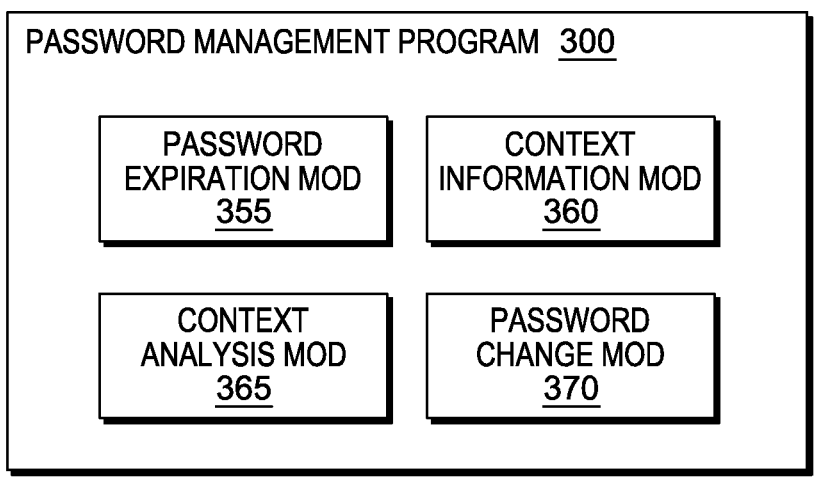
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where password expiration module 355 detects, or identifies, a user's password has expired, or will expire when the user attempts to use a device protected by a password. In this example, the device includes, but is not limited to, (i) a desktop computer; (ii) a laptop computer; (iii) a mobile phone; (iv) a tablet device; and/or (v) a smart TV. Alternatively, the device is protected by authentication tokens. Alternatively, the protected device is, (i) a hard disk; (ii) a USB (universal serial bus) flash drive; (iii) a floppy disk; and/or (iv) a magnetic tape associated with a computer system. Alternatively, a password protected system is an application, including, but not limited to, (i) an operating system; (ii) a business application software; (iii) a business website (e.g., a bank online account); and/or (iv) an email system.

Processing proceeds to step S260, where context information module 360 identifies context information. Context information includes: (i) external factors; (ii) behavioral factors, such as a particular user's work schedule; and/or (ii) ambient factors, identified by, for example, ambient sources. As discussed herein, the context information is grouped into categories to support ranking the information to determine the influence the information should have on the timing of a required password change. Context information that may indicate an inconvenient time includes, but is not limited to: (i) the user's situation, including returning from a long trip, waiting for a taxi at airport, checking into a hotel to access the hotel information while the user's password expires, and being ready to present in front of audience while the user is locked out due to the expiration of password; (ii) time of day, including any time of day not inconvenient for the user; (iii) work-related information, including the user working an ID-shared computer, a server being under attack, a computer system being overloaded; (iv) message-based information, including an important email/text, a high priority ticket being opened against a server where the system administrator tries to connect, but cannot address the problem right away due to the expiration of password and being locked out of the system. In such mentioned scenario, the user will likely change his password without thinking clearly, and, as a result, the password will likely be forgotten later and/or a weak password may be reused or selected, reducing the security of the electronic system. An inconvenient time is one example of a delay condition. Alternative embodiments of the present invention apply to anticipating the expiration of the password, such that the deadline for the required password change is accelerated, forcing the user to change the soon-to-expire password when it is convenient to the user according to context information.

In this example, program 300 collects and identifies the context information through a built-in subprogram that detects the information. Alternatively, program 300 collects the context information through external programs and/or applications by communicating with them, such that a computer system clock and a system calendar providing the user's travel arrangements are accessed. Alternatively program 300 collects such information through a built-in or external device, for example, a microphone through which the user communicates with program 300. Another example would be a global positioning system (GPS) that tells the user has changed locations and is on the road, or traveling to a different country. Alternatively, a "push notification" is used to for program 300 to collect such context information, where an incoming email is received notifying program 300, while the device the user attempts to log in is locked due to password expiration.

Processing proceeds to step S265, where context analysis module 365 analyzes the context information dataset. In this example, analysis of the context information identifies one, or more, delay conditions for postponing the password change requirement. When analyzing the information for timing influence, or a delay condition, considerations that provide for ranking the context information include: (i) relevance; (ii) importance; and/or (iii) urgency. The analysis of such information is scored, for example, on a scale of 1 to 5 where 5 indicates the most influential information. Alternatively, the analysis of such information is categorized as "most severe," "most urgent," "most important," "average severity," "average urgency," "average importance," "least severe," "least urgent," and/or "least important". Alternatively, business/organizational rules configured by a system administrator are included to work in tandem with the contextual information. In such scenario, the administrator may set parameters to control those business rules. For example, the administrator may allow the user to snooze twice only or snooze for two days.

Processing ends at step S270, where password change module 370 changes the deadline of a required password change based on context information. In this example, based on the analysis of the context information determined in step S265, program 300 allows the user a "free pass" for the moment and snoozes the password change for a period of time. The period of time for snoozing is specified by the user, for example, the user estimates a time period during which the condition triggering the snooze can be addressed. Alternatively, the period of time is determined by the assessment outcome, for example, a longer time for the most important information. Alternatively, the time period is determined by corporate policies. Alternatively, the time period is determined by a location, for example, a longer time in the office or at home whereas a shorter time in a public place or transient locations that are less secure. Some embodiments of the present invention give the user an option by asking the user if they would like to change the password now or snooze the password change for a period of time. Alternatively, the password protected device has a limit on the number of snoozes the user is allowed. Alternatively, password change module 370 forces the user to change the password prior to a deadline to change the password in response to the context information that will occur at the deadline to change the password.

Some embodiments of the present invention may include one, or more, of the following features, characteristics and/or advantages: (i) provide flexibility to snooze or ignore the enforcement of a password rule; (ii) apply to both standalone clients (e.g., servers, desktops, mobile devices) where a password is stored locally, as well as federated identity systems (e.g., single sign on) where a password is stored in a different system; (iii) reduce the chance of choosing a weak password; (iv) reduce the chance of choosing a password that is set in a haze and forgotten; (v) from a security perspective, enforce a password change only in certain locations (e.g., in an office or at home), while avoiding public places or transient locations that could be less secure; and/or (vi) limit the chance of forcing a password change during an unsuitable time that could be counterproductive.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices, and/or smart televisions (TVs).

What is claimed is:

1. A method for changing a deadline of a required password change based on context information, the method comprising:
    determining a password change deadline for a user;
    identifying a context information dataset;
    analyzing the context information dataset; and
    changing the password change deadline based, at least in part, on the context information dataset;
    wherein:
    analyzing the context information includes:
        determining a delay condition based, at least in part, on the context information dataset.

2. The method of claim 1, wherein the password change deadline is changed according to one of the following: a user specification, the context information dataset, and a corporate policy.

3. The method of claim 1, wherein the context information dataset includes at least one of the following: external factors, behavioral factors, and ambient factors.

4. The method of claim 1, wherein the context information dataset includes at least one of the following: time of day, a server being under attack, the user presenting in front of an audience, the user checking into a hotel by accessing online hotel information, user location, and an urgent message is awaiting a response from the user.

5. The method of claim 1, wherein the step of analyzing the context information dataset includes ranking a piece of context information based on at least one of the following: relevance, importance, and urgency.

6. The method of claim 1, wherein changing the password change deadline has the effect of postponing the password change deadline.

7. The method of claim 1, wherein the step of analyzing the context information dataset includes considering business rules that are controlled by a system administrator.

8. A computer program product for changing the time of a required password change based on context information, the computer program product comprising a computer readable storage medium having stored thereon:
    first program instructions programmed to determine a password change deadline for a user;
    second program instructions programmed to identify a context information dataset;
    third program instructions programmed to analyze the context information dataset; and
    fourth program instructions programmed to change a password change deadline based, at least in part, on the context information dataset;
    wherein:
    the third program instructions programmed to analyze the context information includes:
        determining a delay condition based, at least in part, on the context information dataset.

9. The program product of claim 8, wherein the password change deadline is changed according to one of the following: a user specification, the context information dataset, and corporate policy.

10. The program product of claim 8 wherein the context information dataset includes at least one of the following: external factors, behavioral factors, and ambient factors.

11. The program product of claim 8, wherein the context information dataset includes at least one of the following: time of day, a server being under attack, the user presenting in front of an audience, the user checking into a hotel by accessing online hotel information, user location, and an urgent message is awaiting a response from the user.

12. The program product of claim 8, wherein the step of analyzing the context information dataset includes ranking a piece of context information based on at least one of the following: relevance, importance, and urgency.

13. The program product of claim 8, wherein changing the password change deadline has the effect of postponing the password change deadline.

14. A computer system for changing the time of a required password change based on context information, the computer system comprising:
    a processor(s) set; and
    a computer readable storage medium;
    wherein:
    the processor set is structured, located, connected, and/or programmed to run program instructions stored on the computer readable storage medium; and the program instructions include:
first program instructions programmed to determine a password change deadline for a user;
second program instructions programmed to identify a context information dataset;
third program instructions programmed to analyze the context information dataset; and
fourth program instructions programmed to change a password change deadline based, at least in part, on the context information dataset;
wherein third program instructions programmed to analyze the context information includes:
determining a delay condition based, at least in part, on the context information dataset.

15. The computer system of claim 14, wherein the password change deadline is changed according to one of the following: the user's specification, the assessment of the ambient sources, and corporate policy.

16. The computer system of claim 14, wherein the context information dataset includes at least one of the following: external factors, behavioral factors, and ambient factors.

17. The computer system of claim 14, wherein the context information dataset includes at least one of the following: time of day, a server being under attack, the user presenting in front of an audience, the user checking into a hotel by accessing online hotel information, user location, and an urgent message is awaiting a response from the user.

* * * * *